Figure 1:
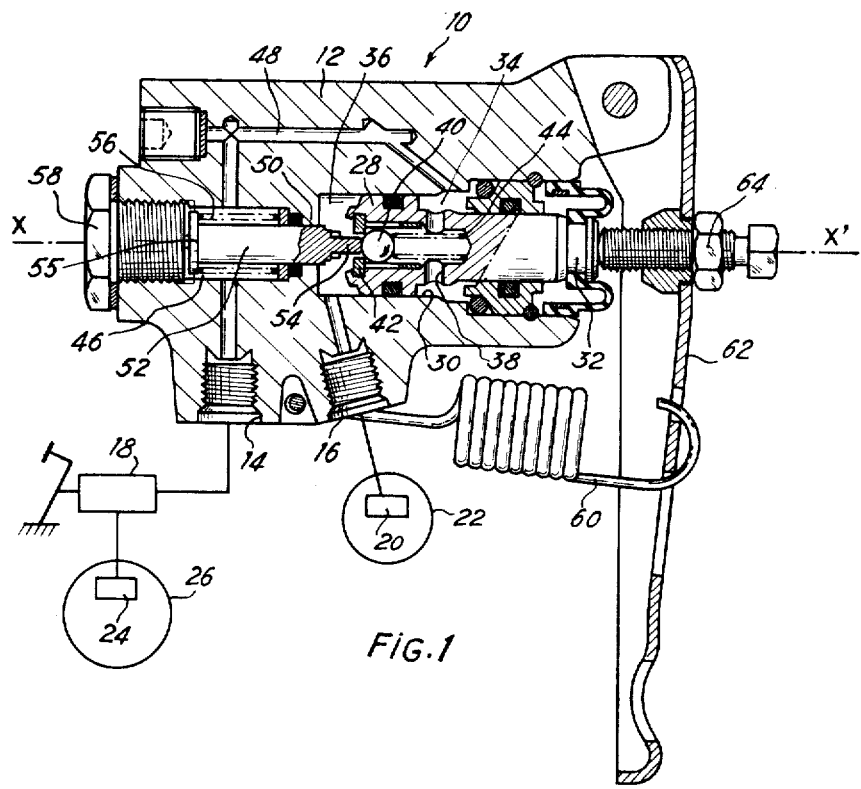

United States Patent [19]

Riquart

[11] 3,904,253
[45] Sept. 9, 1975

[54] BRAKING REGULATOR

[75] Inventor: Christian Riquart, Paris, France

[73] Assignee: The Bendix Corporation, South Bend, Ind.

[22] Filed: Oct. 15, 1974

[21] Appl. No.: 514,345

[30] Foreign Application Priority Data
Oct. 18, 1973 France .............. 73.37155

[52] U.S. Cl. .................. 303/22 R; 303/6 C
[51] Int. Cl.² ........................... B60T 8/22
[58] Field of Search ........ 303/6 C, 6 R, 22 A, 22 R, 303/23 A, 23 R

[56] References Cited
UNITED STATES PATENTS

| | | | |
|---|---|---|---|
| 3,400,986 | 9/1968 | Lawson et al. | 303/22 R X |
| 3,405,978 | 10/1968 | Lepelletier | 303/22 R |
| 3,762,776 | 10/1973 | Kawabe et al. | 303/22 R |
| 3,840,280 | 10/1974 | Watanabe | 303/22 R |

Primary Examiner—Duane A. Reger
Attorney, Agent, or Firm—Leo H. McCormick, Jr.; William N. Antonis

[57] ABSTRACT

The present invention relates to a braking regulator adapted to be inserted between a source of brake fluid and a set of brake actuators of a motor vehicle. The regulator comprises a differential piston 28, dividing the housing into two pressure chambers 34, 36. A passage 38 is provided in the piston, and in which is mounted a ball valve member 40. The ball 40 is urged out of its seat by means of a plunger 52, responsive to the opposing pressure forces resulting from the pressures prevailing in the first and second pressure chambers. The differential piston is moved towards the plunger by means of resilient return means 60.

6 Claims, 2 Drawing Figures

BRAKING REGULATOR

The invention relates to a braking regulator for insertion in the pressure fluid line between a source of brake fluid and a set of brake actuators for the wheels of a motor vehicle.

Braking regulators of this type are used very often in private vehicles in which a first set of brakes associated with the front wheels of the vehicle is connected directly to the pressure source, whereas a second set of brakes associated with the rear wheels of the vehicle is connected to the pressure source by way of a braking regulator. They prevent the brake pressure from rising excessively in the brake actuators of the rear wheels and remove the risk of locking of these wheels when the brakes are released. In particular, the use of braking regulators of the type having a differential piston reduces the rate of pressure increase in these brake actuators beyond a predetermined pressure.

For safety reasons designers have become accustomed to dividing the brake circuits in motor vehicles. Each set of brake actuators is connected to one of two independent portions of a single pressure fluid source, for example to a respective chamber in a conventional tandem master cylinder.

An object of the invention is to eliminate, at least partially, the pressure reducing action of the braking regulator in the event of failure of the brake circuit for the front wheels. This will enable the driver of the vehicle, by pressing firmly on his brake pedal, to recover most of the braking potential of the brakes for the rear wheels.

The invention therefore consists of a braking regulator for insertion between a hydraulic pressure source and a set of brake actuators a motor vehicle, of the type comprising a housing with a stepped bore in which a differential piston is mounted so as to define therein a first and a second pressure chamber adjacent respectively to the piston faces having the smaller and larger effective cross-section, the first chamber being connectible to the pressure source and the second chamber being connectible to the set of brake actuators, the chambers communicating by way of a passage traversing the piston, a valve mounted in the passage and resiliently urged to bear in a fluid-tight manner on a seat provided on the piston, and a resilient return device acting on the piston to move the latter inwards into the second chamber into an idle position fixed relative to the housing, in which position the valve is off its seat due to engagement with an abutment situated in the second chamber, characterized in that the abutment is movable relative to the housing and is subjected to the opposing action of the pressure forces resulting from the pressures prevailing in the first and second chambers.

In a particular embodiment of the invention, the regulator comprises a cavity adjacent to the second chamber and separated from the latter by a wall substantially perpendicular to the axis of the bore, the abutment being situated at one end of a plunger traversing the wall and sliding parallel to the axis of the bore, the cavity being connected by a duct to the first chamber.

Figure 2:
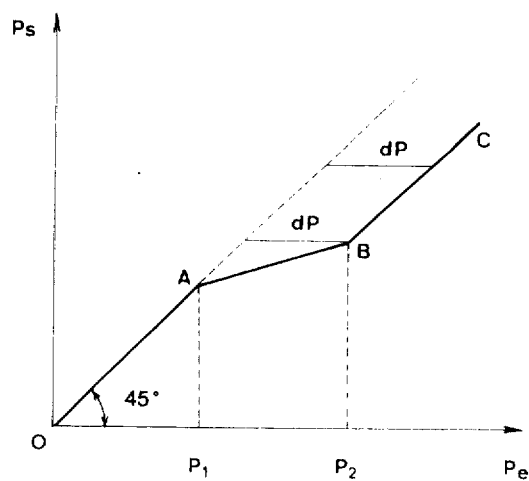

The invention will be better understood, and further advantages will be apparent, from the ensuing description referring to the accompanying drawings, in which:

FIG. 1 represents an axial section through a braking regulator embodying the invention; and FIG. 2 represents a pressure diagram illustrating operation of the braking regulator embodying the invention.

As FIG. 1 shows, the braking regulator 10 comprises a housing 12 with two orifices 14 and 16, connected respectively to a pressure source 18 and to a set 20 of brake actuators associated with the rear wheels 22 of a motor vehicle. The pressure fluid source 18 is a tandem master cylinder well known in the braking art, with one chamber connected to the orifice 14 and the other to the set 24 of brake actuators associated with the front wheels 26 of the vehicle. A differential piston 28 is slidable in a fluid-tight manner in a stepped bore 30 in the housing 12, out of which one of its ends 32 projects. The piston 28 separates two chambers in the housing. The first chamber 34 is adjacent to the face of the differential piston having the smaller effective cross-section and is connected to the inlet orifice 14 and the second chamber 36 is adjacent to the face of said differential piston having the larger effective cross-section and is connected to the outlet orifice 16. A passage 38 through the piston 28 connects the two chambers 34 and 36. Inside the passage a ball valve member 40 is urged by a weak spring on to a valve seat 42 mounted on the piston. The housing also contains a cavity 46 connected to the chamber 34 by a passage 48 in the housing. The cavity 46 is separated from the chamber 36 by a wall 50 substantially perpendicular to the axis X–X' of the bore 30. A plunger 52 slides in a fluid-tight manner through the wall 50. One end 54 of the plunger can co-operate with the ball 40 so as to push it off its seat 42; the other plunger end 55 bears a shoulder which co-operates with a spring 56. The plunger 52 moves parallel to the axis of the bore X–X' under the influence of the pressure forces prevailing in the first and second chambers and also of the spring 56, which counteracts the pressure forces prevailing in the cavity 46 and which urges the plunger outwards from the chamber 36 into a limit position, where it abuts on a plug 58 mounted on the housing 12. The differential piston 28 is urged into the chamber 36 by resilient return means 60, which act on its end 32 by way of a lever 62 pivoted on the housing and by way of screw-type regulating means 64 for adjusting the initial calibration of the resilient means 60. The free end of the lever 62 is designed to be connected to the vehicle suspension, so that the calibration of the resilient means 60 can vary with the load distribution between the different axles of the vehicle.

It should be noted that the piston 28 of the regulator is not illustrated in its idle position, in which the ball is pushed off its seat by the abutment 54. In FIG. 1, the differential piston is a few millimetres to the right of its idle position, and is in the limit position in which the ball 40 just rests on the seat 42 disconnecting the two chambers 34, 36.

The operation of the regulator just described is as follows. It is illustrated in the diagram in FIG. 2, in which the abscissae represent the pressure Pe at the inlet orifice of the regulator and in the first chamber 34 of the regulator, whereas the ordinates represent the pressure Ps at the outlet orifice 16 of the regulator and in the second pressure chamber. When the brake circuit is idle, the resilient means 60 urge the differential piston to the left in FIG. 1, so that fluid can flow between the two chambers 34, 36. When the driver depresses the brake pedal, the pressure will rise simultaneously in both sets of brake actuators 20, 24. As regards the pressure in the actuator set 20 for the rear wheels of the vehicle, there is a first phase in which the chambers 34, 36 still communicate. This first phase is represented in FIG. 2 by the line OA. At a predetermined inlet pressure P1, which moreover varies with the return force of the spring 60 in accordance with the load distribution between the vehicle axles, motion of the piston 28 to the right in FIG. 1 will reach a distance such that the ball 40 is in fluid-tight contact with the seat 42. This limit position of the differential piston is shown in FIG. 1. As a result a second braking phase will occur, during which the piston will oscillate about this limit position so that the valve 40 opens and closes a plurality of times in succession. Assuming that the axle load distribution is constant, the pressure at the outlet orifice will be represented by the line AB in FIG. 2. The gradient of the line AB is substantially equal to the ratio between the effective cross-sections of the opposite faces of the differential piston 28. If, for one reason or another, the driver is obliged to press hard on the master cylinder pedal, whether because he has to brake his vehicle rapidly or because the brake circuit associated with the front wheels of his vehicle is faulty, the pressure at the inlet orifice 14 of the regulator will increase substantially. The pressure difference across the wall 50 will therefore be sufficient to counteract the spring 56 and to move the plunger 52 to the right in FIG. 1. This pressure difference is represented in FIG. 2 by the line dP. The abutment 54 will now push the ball 40 off its seat 42, opening the passage between the chambers 34 and 36. The passage will be open very briefly, since the pressure rise in the chamber 36 reduces the pressure difference across the wall 50. The differential piston 28 will therefore again oscillate about this new equilibrium position, and the pressure in the rear brakes of the vehicle will rise as indicated by the line BC in FIG. 2. Seeing that the calibration of the spring 56 is constant, the pressure difference dP remains constant throughout this braking phase, and the line BC is therefore parallel to the line OA, which in turn is situated on the bisectrix of the angle P$s$OP$e$.

The invention provides a third braking phase in which the rate of pressure increase is equal to that in the first braking phase, that is to say, in which the variation in the brake pressure in the actuator for the rear brakes of the vehicle is equal to the variation in the brake pressure in the corresponding chamber of the master cylinder. It should be noted, however, that the total brake pressure existing in the rear brake sets of the vehicle is less by an amount dP than the brake pressure existing in the corresponding chamber of the master cylinder. This feature avoids abrupt opening of the valve 40 at the point B and prevents the pressure in the rear brake sets of the vehicle from rising very sharply and perhaps causing one of these wheels to lock. It should also be noted that the pressure P2 corresponding to the beginning of the third braking phase (point B) varies with the position of the lever 62 and therefore responds to variations in the axle load distribution. When the driver releases his brake pedal, operation takes place in the reverse manner, with slight hysteresis due chiefly to the effective cross-section of the seat of the ball valve 40.

I claim:

1. In a braking system of a vehicle comprising a hydraulic pressure source and at least a set of brake actuators, a braking regulator for insertion between said hydraulic pressure source and said set of brake actuators, said regulator comprising:
   a housing with a stepped bore therein;
   a differential piston slidably mounted in said housing and defining therewith a first and a second pressure chamber;
   said first pressure chamber being adjacent to the piston face having the larger effective cross section and being connected to the set of brake actuators;
   a passage provided in the piston for communicating said first and said second pressure chambers;
   valve means mounted in said passage and resiliently urged to bear in a fluid tight manner on a seat provided on said piston;
   resilient return means for continually urging said piston towards said second pressure chamber;
   abutting means situated in said second pressure chamber for disengaging said valve means off their seat upon movement of said piston towards said second pressure chamber, said abutting means being movable relative to the housing and being subjected to the opposite actions of the pressures in the first and second chambers for controlling the communication of the pressure source from the first pressure chamber to the second pressure chamber.

2. The invention of claim 1, further comprising:
   a cavity adjacent to the second chamber, and separated from the latter by wall means;
   a plunger traversing said wall means and at one end of which is situated the abutting means, said plunger sliding parallel to the axis of said bore;
   conduit means connecting said cavity to said first pressure chamber.

3. The invention of claim 2, wherein:
   said wall means is substantially perpendicular to the axis of said bore.

4. The invention of claim 1, and stop means for restricting motion of said abutting means outwards from the second chamber.

5. The invention of claim 2, and resilient means acting on said plunger and counteracting the force resulting from the pressure in the first chamber.

6. The invention of claim 1, and means operated by the suspension of the vehicle, for varying the calibration of the resilient return means as a function of changes in the load distribution between the axles of the vehicle.

* * * * *